July 17, 1956

W. R. REED 2,754,787

INTERNAL LINE-UP CLAMP

Filed Jan. 6, 1954

INVENTOR.
Wade R. Reed
BY Victor J. Evans & Co.
ATTORNEYS

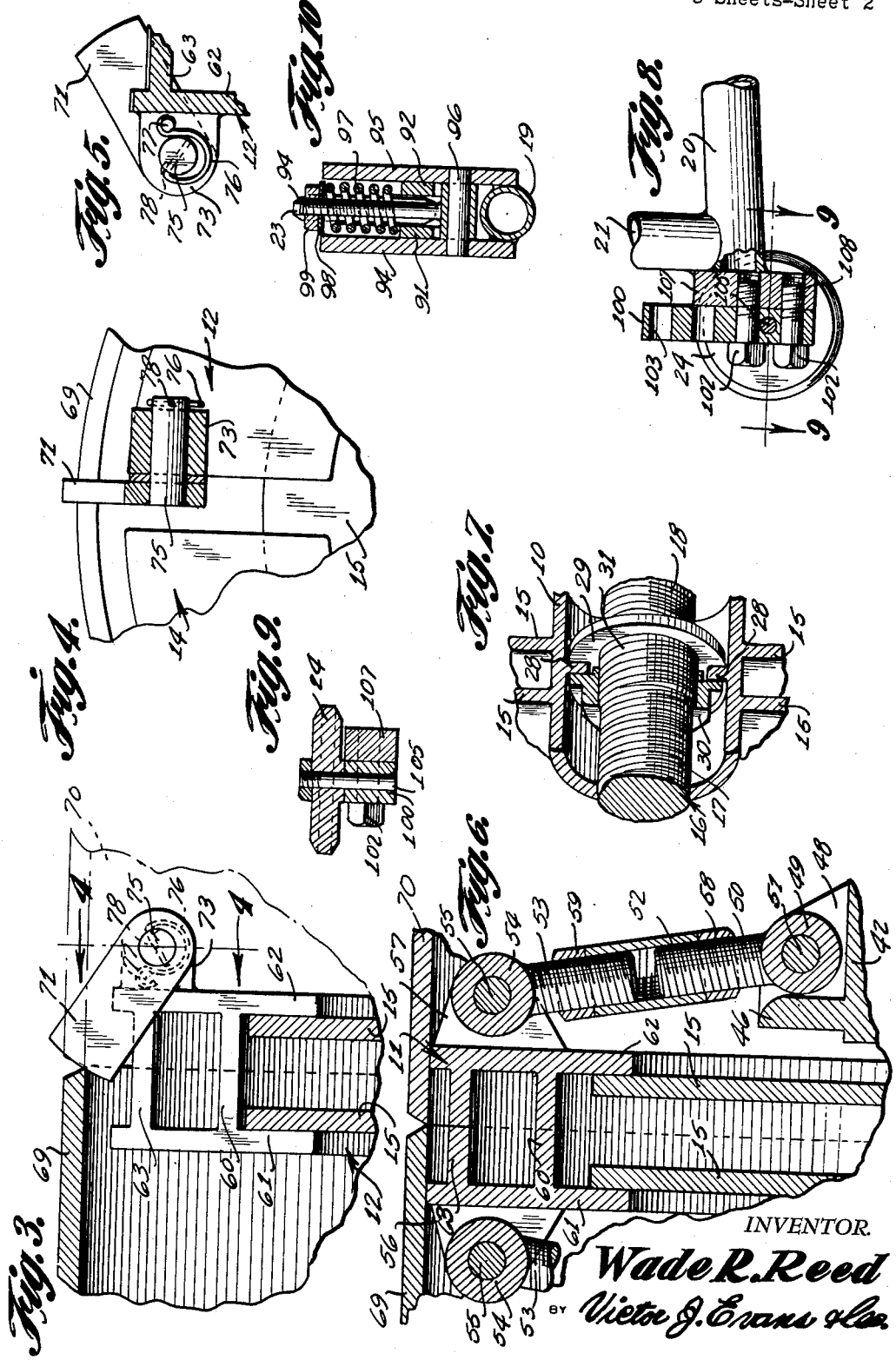

July 17, 1956
W. R. REED
2,754,787
INTERNAL LINE-UP CLAMP
Filed Jan. 6, 1954
3 Sheets-Sheet 3
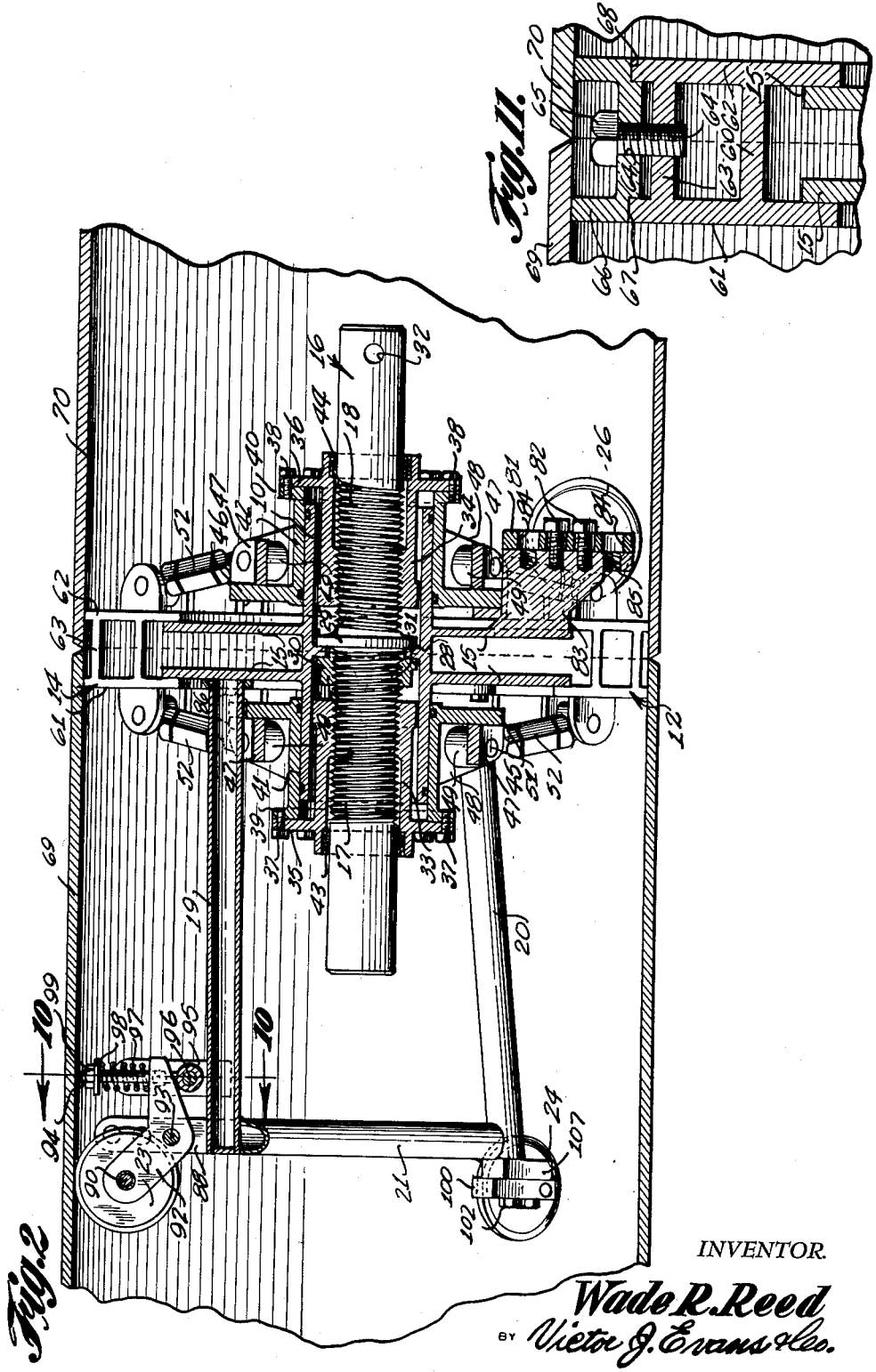
INVENTOR.
Wade R. Reed
BY Victor J. Evans & Co.
ATTORNEYS United States Patent Office 2,754,787
Patented July 17, 1956

2,754,787
INTERNAL LINE-UP CLAMP
Wade R. Reed, Tulsa, Okla.
Application January 6, 1954, Serial No. 402,552
3 Claims. (Cl. 113—102)

This invention relates to pipe lines particularly used for oil and gas, and in particular a clamp for aligning meeting ends of pipe joints to facilitate retaining the ends of the joints in alignment for welding whereby the inner surfaces of the joints are smooth at the weld.

The purpose of this invention is to provide means for retaining a pipe joint in position at the end of a pipe line whereby the joint is positively retained in position as a weld is made continuously around the circumference of the pipe.

In laying pipe lines additional joints are welded consecutively to the ends of lines and as it is difficult to rotate the entire pipe line it is difficult to hold the line and joint in position so that the inner surfaces are in alignment and smooth when the weld is completed. With this thought in mind this invention contemplates an internal clamp having a plurality of shoes on the ends of radially disposed arms whereby with the shoes positioned to straddle the joints or meeting ends of pipe joints and urged outwardly with toggle action the joints of pipe are positively gripped from the interior with the outer surface exposed and unobstructed.

Various types of rigs have been provided for holding joints of pipe in alignment for welding, however, such devices have not been found successful for this use.

Furthermore, with a conventional length of pipe it is difficult to locate and operate gripping elements on the inside of the pipe from the extended end of the joint and for this reason this invention uses latches or dogs that are adapted to be moved outwardly to locate the pipe gripping shoes on the joint between two lengths of pipe.

The object of this invention is, therefore, to provide aligning means for clamping joints of pipe with ends thereof in meeting relation to facilitate welding in which the aligning and clamping elements are positioned on the inside of the pipe.

Another object of the invention is to provide a clamp for retaining abutting ends of joints of pipe in position for welding in which the clamping elements are adapted to compensate for pipe walls of different thicknesses.

A further object of the invention is to provide an internal clamp for retaining ends of joints of pipe in position for welding in which the clamp is of a comparatively simple and economical construction.

With these and other objects and advantages in view the invention embodies a cylindrical body having radially disposed arms extended therefrom, with shoes slidably mounted on the arms, with a right and left hand threaded screw or shaft extended through the sleeve, with toggle elements actuated by the threads of the shaft and connected to the shoes and with positioning latches in the shoes for locating the clamp with spaced flanges of the shoes equally spaced on opposite sides of the end of a joint of pipe.

Other features and advantages of the invention will appear from the following description taken in connection with the drawings, wherein:

Figure 2 is a longitudinal section through the clamp, taken on line 2—2 of Fig. 1 showing the clamp positioned at the end of a joint of pipe with the shoes thereof straddling the meeting ends of the joint and pipe, to which the joint is to be welded.

Figure 3 is a detail showing a section taken on line 3—3 of Fig. 1 illustrating one of the latches for locating the clamp at the end of a pipe section.

Figure 4 is a section taken on line 4—4 of Fig. 3 showing the pivotal mounting of the latch.

Figure 5 is a detail looking toward the opposite side of the latch shown in Fig. 3 illustrating a spring for retaining the latches in outwardly extended positions.

Figure 6 is a section taken on line 6—6 of Fig. 1 illustrating one of the turnbuckles forming part of the toggle action.

Figure 7 is a view, in perspective, illustrating the sections connecting the clamp to the shaft having right and left hand threads thereon.

Figure 8 is a section taken on line 8—8 of Fig. 1 showing a roller mounting at the end of the after carriage.

Figure 9 is a section taken on line 9—9 of Fig. 8 illustrating the roller spindle.

Figure 10 is a section taken on line 10—10 of Fig. 2 showing the spring assembly for urging the upper roller against the inner surface of the pipe.

Figure 11 is a detail showing a section through the outer end of one of the shoes and illustrating an extension attached to the shoe for increasing the diameter of a clamp to compensate for a pipe of a larger diameter.

Figure 1:
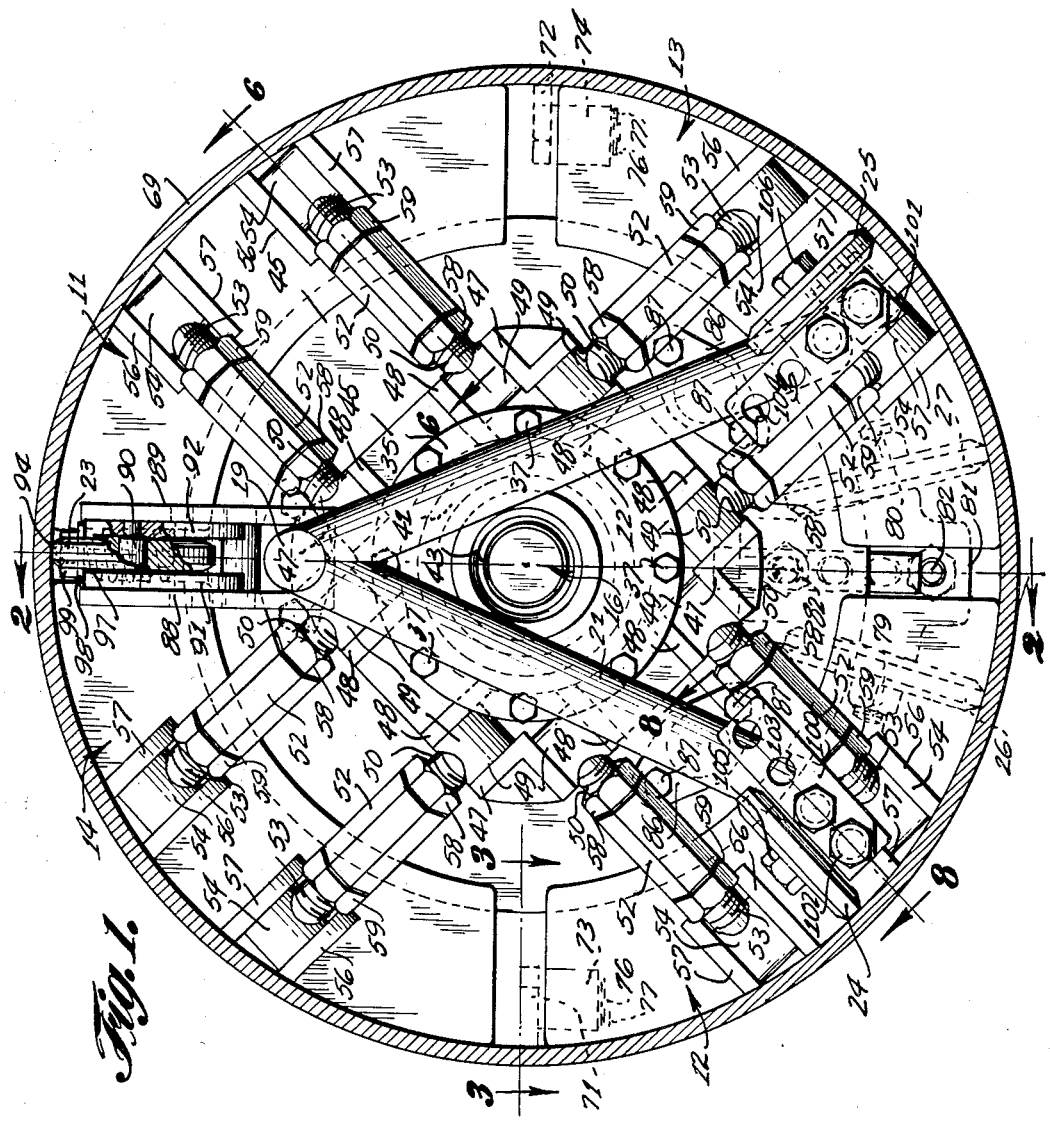
Figure 1 is a cross section through a pipe with a clamp of this invention therein showing the pipe gripping shoes with an after carriage for retaining the clamp in position and also showing a pair of rollers for supporting the clamp proper, the rollers being shown in dotted lines.

The drawings illustrate a clamp including a head with pipe gripping elements radially positioned and slidably mounted thereon, and with right and left hand screws in combination with toggle elements and sliding members for expanding and contracting said gripping elements.

Referring now to the drawings wherein like reference characters denote corresponding parts the improved aligning clamp of this invention includes a head including an elongated sleeve 10, shoes 11, 12, 13 and 14 having flanges slidably mounted on radially disposed arms with plates 15 extended outwardly from the sleeve 10, a shaft 16 having right hand threads 17 and left hand threads 18 thereon extended through the sleeve 10, suitable toggle elements threaded on the shaft and connected to the shoes for expanding and contracting the shoes, an after carriage having an upper beam 19 and lower beams 20 connected with arms 21 and 22 and having an upper roller 23 and lower rollers 24 and 25, and supporting rollers as indicated by the dotted lines 26 and 27, in Fig. 1. The sleeve or cylinder 10 is provided with a centrally positioned inner annular rib 28 that is retained in position against a flange 29 on the shaft 16 by a lock nut 30 that is threaded on an enlarged portion 31 of the shaft. The extended end of the shaft is provided with an opening 32 by which an extension rod or handle may be connected to one end of the shaft for rotating the shaft to expand or contract the shoes.

Internally threaded bushings 33 and 34 are threaded on opposite ends of the shaft and these bushings, which extend into opposite ends of the sleeve 10 are provided with flanges 35 and 36, respectively which are secured by bolts 37 and 38 to flanges 39 and 40 of cylinders 41 and 42 respectively. The outer end of the bushing 33 is provided with an oil seal 43 and a similar oil seal 44 is provided in the outer end of the bushing 34. Suitable packing glands or rings may also be provided between the members.

The inner end of the cylinder 41 is provided with a substantially rectangular-shaped plate 45 and a similar plate 46 is provided on the inner end of the cylinder 42. Each of the plates 45 and 46 is provided with four pairs of spaced lugs, such as the lugs 47 and 48 and between each pair of lugs is a hub 49 of a threaded stud 50, the hubs being pivotally mounted by pins 51. The studs 50 are threaded into elongated nuts 52, the opposite ends of which are threaded on similar studs 53 and, as illustrated in Fig. 6, the studs 53 are also provided with hubs 54 that are pivotally mounted with pins 55 between spaced pairs of lugs, such as the lugs 56 and 57 on the upper arcuate shoes 11 and 14. The studs and nuts 52 provide turnbuckles and, as shown in Fig. 1, the studs 50 are provided with lock nuts 58 and similar lock nuts 59 are provided on the studs 53. The studs of the turnbuckles on the lower side of the clamp are connected by similar lugs and pins to the shoes 12 and 13.

Each of the shoes is substantially H-shaped in cross section having an intermediate web 60 positioned between side plates 61 and 62 and having an outer additional web 63 spaced from the web 60.

As illustrated in Fig. 11 the outer web 63 is provided with threaded openings 64 that are positioned to receive cap screws 65 for attaching outer sections 66 to the shoes, thereby providing adjusting means so that the clamp may be used in pipes of different diameters. The section 66 is provided with arcuate recesses 67 and 68 that are positioned to receive the outer edges of the plates 61 and 62 of the shoes.

With the shoes slidably mounted over the flange 15 of the sleeve 10 and connected by turnbuckle elements to the cylinders 41 and 42 mounted on the bushings 33 and 34 rotation of the shaft 16 in one direction retracts the shoes and rotation of the shaft in the opposite direction expands the shoes with the outer edges of the side plates 61 and 62 urged into engagement with inner surfaces of pipe joints, such as the joints 69 and 70.

The clamp is positioned in the end of a pipe line, as illustrated in Figs. 2 and 3, and as the clamp is drawn outwardly latches 71 and 72 pivotally mounted in hubs 73 and 74 of the shoes 12 and 13 snap outwardly, as illustrated in Fig. 3, thereby providing means for setting the clamp with the end of the pipe line 69 positioned midway between the side plates 61 and 62 of the shoes. As another pipe joint, as indicated by the numeral 70, is moved into position over the shoes the latches are moved inwardly by the pipe and the shoes are expanded whereby plates on one of the sides of the shoes grip the pipe line and the plates on the opposite side grip the joint for holding the joint in alignment with the pipe line until a V-shaped annular recess between the pipe line and joint is filled with weld material.

As illustrated in Figs. 4 and 5 the latches are pivotally mounted in the lugs or bearings with pins 75 and springs 76 mounted on pins 77 at one of the ends thereof are positioned with their opposite ends extended through openings 78 in the pins 75; whereby the springs urge the latches outwardly to the position shown in Fig. 3.

The support rollers 26 and 27 of the clamp are journaled on studs 79 and 80 of a bearing 81 that is secured by bolts 82 to the flange 15 extended from the sleeve 10, the bearing being positioned on a lug 83 extended from the flange, as shown in Fig. 2. The bearing 81 is provided with spaced openings 84 and the lug 83 is provided with spaced threaded sockets 85 whereby the bolts, or cap screws 82 are adapted to extend through the openings 84 and into the sockets 85 to provide means for adjusting the positions of the support rollers 26 and 27. As illustrated in Fig. 1 the lug 83 is positioned between the ends of the shoes 12 and 13, at the lower side of the clamp.

The upper beam 19 and the lower beams 20 of the after carriage are provided with flanges, such as the flanges 86 by which the beams are secured to the flange 14 with bolts, such as the bolts 87.

The extended end of the after carriage is provided with upwardly extended bars 88 and 89, as shown in Fig. 1. The roller 23 is pivotally mounted by a stud 90 in levers 91 and 92 which are pivotally mounted by a pin 93 in the bars 88 and 89. The levers 91 and 92 are positioned to straddle a bolt 94 that is mounted in a yoke 95 on the upper beam 19 of the after carriage with a pin 96 and the ends of the levers are urged downwardly by a spring 97, extended around the bolt 94 and positioned between upper surfaces of the levers and a washer 98 that is adjustably held on the bolt 94 with a nut 99. By this means tension on the roller 23 is adjustable to facilitate centering the after carriage and clamp in a pipe line.

The lower ends of the arms 21 and 22 are provided with bearings 100 and 101 that are secured to the lower ends of the arms with bolts 102 and, as shown in Fig. 1 the bearings are provided with spaced openings 103 and 104 which provide means for adjusting the positions of the rollers on the bearings. The roller 24 is secured in position with a stud 105 and the roller 25 is mounted on a similar stud 106.

As illustrated in Fig. 8 the ends of the beams 20 and arms or struts 21 and 22 are secured together, preferably by welding and the bearings 100 and 101 are secured to blocks or plates as indicated by the numeral 107, the plates being provided with threaded openings 108 into which the cap screws or bolts 102 are threaded.

With the parts arranged and assembled in this manner the aligning clamp of this invention is positioned in the end of a pipe line, as hereinbefore stated, with the end of the pipe positioned midway between the sides of the shoes and with a pipe joint to be welded to the end of the pipe line positioned over the opposite sides of the shoes, as shown in Fig. 2 and with the shaft 16 rotated from the extended end of the pipe joint the shoes move outwardly equally continuously gripping the inner surfaces of the pipe line and joint whereby the inner surfaces are retained in alignment as the pipe joint is welded to the end of the pipe line.

With the weld completed the shaft 16 is rotated in the opposite direction whereby the shoes are retracted and the clamp is moved to the end of the pipe joint added to the pipe line whereby another joint may be retained in position for welding in the same manner.

The shoes may be provided in different sizes and sections or other parts may be added to the shoes, as illustrated in Fig. 11 to correspond with pipe of different diameters.

It will also be understood that the shaft may be rotated by a motor either electrically, pneumatically or hydraulically operated and the shoes may also be expanded and retracted by electrical or hydraulic or pneumatic means.

Other modifications may be made in the design and arrangement of the parts, within the scope of the appended claims, without departing from the spirit of the invention.

What is claimed is:

1. In a pipe aligning tool, the combination which comprises a shaft having an annular flange positioned substantially midway of the length thereof and having right hand threads extended from one side of the flange and left hand threads extended from the opposite side, internally threaded bushings extended over the threaded portions of the shaft and positioned with the threads thereof in meshing relation with the threads of the shaft, an elongated sleeve extended around the bushings and having spaced transversely positioned flanges extended outwardly from the intermediate part thereof and an annular rib extended inwardly from a point positioned between the flanges, the annular flange of the shaft being secured against the annular rib of the sleeve, cylinders slidably mounted on ends of the elongated sleeve, means connecting the cylinders to the bushings, shoes including spaced plates connected with webs slidably mounted on the spaced flanges of the elongated sleeve, and studs pivotally mounted on the cylinders and pivotally connected to the shoes whereby the shoes are extended and retracted upon rotation of the shaft.

2. In a pipe aligning tool, the combination which comprises a shaft an annular flange positioned substantially midway of the length thereof and having right hand threads extended from one side of the flange and left hand threads extended from the opposite side, internally threaded bushings extended over the threaded portions of the shaft and positioned with the threads thereof in meshing relation with the threads of the shaft, an elongated sleeve extended around the bushings and having spaced transversely positioned flanges extended outwardly from the intermediate part thereof and an annular rib extended inwardly from a point positioned between the flanges, the annular flange of the shaft being secured against the annular rib of the sleeve, cylinders slidably mounted on ends of the elongated sleeve, means connecting the cylinders to the bushings, shoes including spaced plates connected with webs slidably mounted on the spaced flanges of the elongated sleeve, and studs having turn buckles therein pivotally mounted on the cylinders and positioned with opposite ends thereof pivotally connected to the shoes whereby upon rotation of the shaft in one direction the shoes are extended and upon rotation of the shaft in the opposite direction the shoes are retracted.

3. In a pipe aligning tool, the combination which comprises a shaft having an annular flange positioned substantially midway of the length thereof and having right hand threads extended from one side of the flange and left hand threads extended from the opposite side, internally threaded bushings extended over the threaded portions of the shaft and positioned with the threads thereof in meshing relation with the threads of the shaft, an elongated sleeve extended around the bushings and having spaced transversely positioned flanges extended outwardly from the intermediate part thereof and an annular rib extended inwardly from a point positioned between the flanges, the annular flange of the shaft being secured against the annular rib of the sleeve, cylinders slidably mounted on ends of the elongated sleeve, means connecting the cylinders to the bushings, shoes including spaced plates connected with webs slidably mounted on the spaced flanges of the elongated sleeve, studs having turn buckles therein pivotally mounted on the cylinders and positioned with opposite ends thereof pivotally connected to the shoes whereby upon rotation of the shaft in one direction the shoes are extended and upon rotation of the shaft in the opposite direction the shoes are retracted, and an after carriage having an upper beam and spaced lower beams integral with one of the transversely positioned flanges of the sleeve and having rollers rotatably mounted on extended ends of said beams.

References Cited in the file of this patent
UNITED STATES PATENTS

| | | |
|---|---|---|
| 766,459 | Moxham | Aug. 2, 1904 |
| 2,040,785 | Esch | May 12, 1936 |
| 2,413,103 | Forbes | Dec. 24, 1946 |
| 2,429,053 | Forbes | Oct. 14, 1947 |
| 2,525,680 | Ingemarson | Oct. 10, 1950 |
| 2,587,940 | Webster | Mar. 4, 1952 |
| 2,594,000 | Elliott | Apr. 22, 1952 |